July 11, 1967 H. P. FOCHLER 3,330,303

COMPOSITE TUBING STRUCTURE

Filed June 15, 1964

INVENTOR.
HELMUT P. FOCHLER
BY
Teare, Fetzer & Teare
ATTORNEYS

July 11, 1967

H. P. FOCHLER 3,330,303

COMPOSITE TUBING STRUCTURE

Filed June 15, 1964

INVENTOR.
HELMUT P. FOCHLER
BY
Teare, Fetzer & Teare
ATTORNEYS

INVENTOR.
HELMUT P. FOCHLER
BY *[signature]*
ATTORNEYS

United States Patent Office 3,330,303

Patented July 11, 1967

3,330,303

COMPOSITE TUBING STRUCTURE

Helmut P. Fochler, Chagrin Falls, Ohio, assignor, by mesne assignments, to Continental Oil Company, a corporation of Delaware Filed June 15, 1964, Ser. No. 374,901
8 Claims. (Cl. 138—120)

This invention relates generally to a tubing structure and is more particularly directed to an improved high strength, crush resistant, composite tubing structure.

Heretofore, various types and arrangements of conduit or pipe have been useful in conjunction with the conveyance and/or transmission of energy from one area to another and under a variety of environmental conditions. In one such application, electrical energy has heretofore been transmitted via electrical conductors mounted within conventional type conduit or pipe buried into the earth, concrete or the like, dependent upon the particular industrial and/or commercial application thereof. Such conventional conduit or pipe has heretofore been of a generally rigid, unitary cylindrical construction made from materials, such as concrete, asbestos fiber, clay or metal. In such conduit or pipe the flexibility thereof has been generally provided solely by the elastic characteristics of the material itself. It has been found, however, that while such conventional conduit or pipe, being of a unitary rigid construction, provides generally good strength characteristics, it does not provide optimum flexibility, particularly in the environment of transmitting energy due to the shifting movement and/or changing contour of the supporting media in which it may be situated, such as when buried in the earth or in concrete.

Heretofore, efforts to manufacture conduit or pipe of conventional unitary, cylindrical construction from synthetic materials, such as plastic or the like, have not been satisfactory. In one instance, it has been found that one of the major difficulties encountered in the transmission of energy, as mentioned above, resides in the inability of the plastic type conduit or pipe to incorporate sufficient crush-resistant characteristtics within the operating limits of a particular application. This difficulty resides principally in the fact that such plastic types of conduit or pipe necessitates an economically unfeasible construction, namely, a construction having a considerably increased wall thickness in order to withstand the extremely high loads to which it is generally subjected in normal usage. In many such applications, the conduit or pipe is required to withstand a crush resistance in excess of about 2000 pounds per lineal foot at one-quarter inch deflection. Accordingly, in order to sustain such loads the cost of material for such unitary plastic conduit or pipe having the required wall thickness would substantially exceed the cost of plastic conduit or pipe as presently manufactured.

Briefly, the present invention provides an improved composite, corrugated tubing structure which possesses high strength and especially good crush-resistance characteristics, and which can be facilely and economically produced by conventional transforming techniques.

The composite tubing structure includes an inner, generally cylindrical tube or casing or predetermined length made from flexible or non-flexible materials, such as moldable or extrudable polymeric materials or metal, which will present a smooth-walled interior surface, and an outer corrugated tube of predetermined length made from flexible materials, such as moldable or extrudable polymeric materials or metal having spring-like characteristics, encompassing the inner cylindrical tube to provide a composite tubular structure having a corrugated flexible outer surface. In addition, each composite, corrugated tubing structure includes means at the opposed ends thereof for coupling one or any number of similar such types of composite, corrugated tubular structures together in concentric, axial alignment to provide a continuous tubular system for the conveyance of materials therethrough.

Accordingly, it is an object of the present invention to provide an improved composite tubular structure which possesses high strength, and especially good crush resistant characteristics.

Another object of the present invention is to provide a composite tubular structure of the character described which can be formed facilely and economically produced compared to heretofore known arrangements for the conveyance and/or transmission of energy.

A further object of the present invention is to provide an improved composite tubular structure of the character described which includes an inner generally cylindrical tube or casing, an outer corrugated tube disposed in encompassing relation about said inner tube or casing, and wherein the combined wall thickness of the inner and outer tube is substantially less compared to the wall thickness of heretofore known arrangements with similar strength and crush-resistant characteristics.

A still further object of the present invention is to provide a composite tubular structure of the character described which includes means at the opposed ends thereof for coupling one or any number of similar composite tubular structures together to provide a continuous system for the conveyance and/or transmission of energy from one area to another.

Other features and advantages of the invention will be apparent from the following description taken in conjunction with the accompanying drawings wherein.

Figure 1:
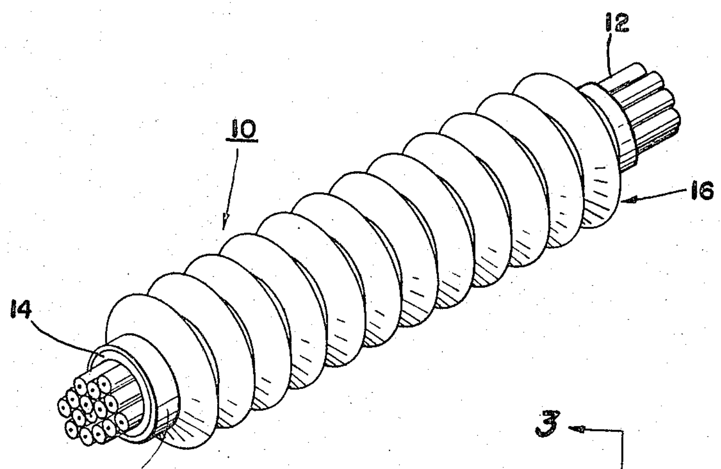
FIG. 1 is a generally perspective view of the composite tubing structure constructed in accordance with the present invention and diagrammatically illustrating a plurality of electrical conductors enclosed therein for the transmission of electrical energy.
Figure 2:
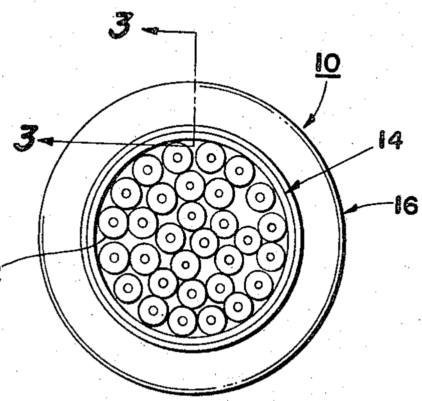
FIG. 2 is an end view of the composite tubing structure of FIG. 1, and showing the electrical conductors therein.
Figure 3:
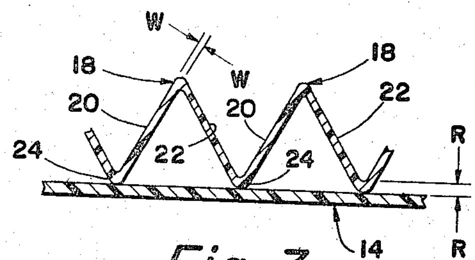
FIG. 3 is an enlarged, sectional view, taken substantially along the plane of line 3—3 of FIG. 2.

Referring now more particularly to FIGS. 1 to 3 of the drawings, there is illustrated generally at 10 a composite tubing structure for the use in conveyance and/or transmission of electrical energy or the like from one area to another, as for instance, by means of a plurality or bundle of electrical conductors 12. The composite tubing structure in the embodiment shown comprises an inner tube or casing 14 made from polymeric materials, such as polyvinyl chloride, styrene or the like, which forms an encasement for the electrical conductors 12. The inner tube 14 may be formed by conventional molding and/or extrusion techniques, as known in the art, and cut into the desired predetermined length suitable for a particular application.

As shown, the inner tube 14 serves as a support for the surrounding outer tubing 16. The outer tubing 16, in the embodiment shown, is preferably formed with a plurality of symmetrically arranged corrugations 18 (FIG. 3) extending axially along the length thereof, which together provide the major strength and crush resistant characteristics in the finalized corrugated tubing structure. In this form, the outer tubing 16 may similarly be made from polymeric materials, such as polyvinyl chloride, styrene or the like, and made separately from or simultaneously with the formation of the inner tube 14, thereby resulting in a highly economical corrugated tubing product.

In the embodiment shown, each corrugation 18 is preferably constructed and arranged to include downwardly and divergently outwardly extending generally thin, yet rigid planar sides 20 and 22. The sides 20 and 22 smoothly merge into thickened trough-like radii 24 which integrally join adjacent sides of the respective corrugations together, along the full length of the tubing, to form the finalized composite corrugated product. The thin, yet rigid sides 20 and 22 of each of the respective corrugations 18 extend radially in somewhat of a triangular, arch-like configuration, around the exterior of the inner tube 14, to provide considerable resistance to radial load pressures exerted thereon, thereby providing especially high crush-resistance in normal application thereon. The respective sides 20 and 22 are preferably of a substantially lesser thickness, as at W—W, compared to the thickness of the inner connecting trough-like radii 24, as at R—R. The relatively thickened trough-like radii 24 provide considerable strength in joining adjacent corrugations together and prevent axial distortion and/or shifting movement along the longitudinal dimension of the tubing. Furthermore, the relative differential in thickness between the sides 20 and 22 and the trough-like radii 24 enables a predetermined length of inner tube 14 to be formed simultaneously with or separately from the same given length of outer tubing 16, thereby greatly reducing the number of steps and, hence, the cost of producing such composite tubing structure.

In this form, and as best illustrated in FIGS. 2 and 3, the adjacent corrugations 18 of the outer tubing 16 are preferably of the same diameter and with the transverse dimension defined thereby being slightly greater than the transverse dimension of the inner tubing 14 so that the latter may be tightly, yet slidably inserted axially into the outer tubing. Moreover, in the assembled position, the trough-like radii 24 of the outer tubing 16 are disposed in surface-to-surface contact or in contiguous relationship with portions of the outer peripheral surface of the inner tube 14, thereby to provide an effective arrangement for the transmission of radial load pressures to the more or less rigid inner tube 14.

Figure 4:
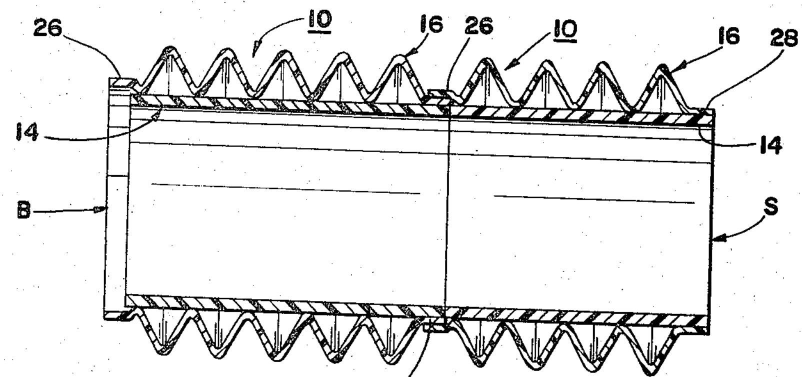
FIG. 4 is a fragmentary, longitudinal sectional view illustrating two of the composite tubing structures of the present invention coupled together in overlapping relationship.
Figure 5:
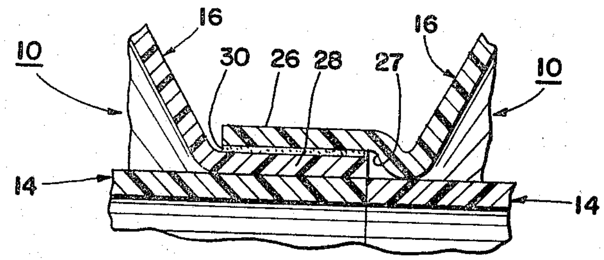
FIG. 5 is an enlarged, fragmentary section view illustrating one form of construction for coupling two or more of the composite tubing structures together, as shown in FIG. 4.

As best illustrated in FIGS. 4 and 5, and for the purpose of providing a continuous system for the conveyance and/or transmission of energy from one area to another, each composite tubing structure may be provided with a coupling means at the opposed ends thereof for joining one or any number of similar such tubing structures together in end-to-end relation. In the embodiment shown, the tubing structure may be provided at one end with a bell B and at its other end with a spigot S construction. As best shown in FIGS. 4 and 5, the bell B construction includes a generally annular, endless flange 26 bent upwardly and outwardly as at 27, and which forms an extension of the outer corrugated tubing 16. The flange 26 is preferably of a diameter so as to be spaced from the exterior peripheral surface of the inner tube 14 and by an amount sufficient to tightly receive in the space defined therebetween the spigot end S of a similar composite tubing structure to be coupled thereto.

The spigot end S in the embodiment shown is constructed with an integral annular flange 28 extending outwardly from and similarly forming an extension of the outer corrugated tubing 16, but with the diameter of the flange 28 being of a dimension to fit tightly, yet slidably about the exterior peripheral surface of the inner tubing 14, so as to be slidably inserted in underlying relationship relative to the aforementioned flange 26 on the bell end B of a similar composite tubing structure. Such overlapping relationship provides an effective and strong interconnecting joint between any number of adjacent tubing structure when disposed in end-to-end relation, and prevents the entry of dust, water and other deleterious materials from entering into the tubing system. In such instances, the dimensional relationship between the bell B and spigot S ends of the respective tubing structures may be constructed and arranged so that the respective tubing structures can be effectively pressed-fitted together or in other instances and adhesive, such as shown at 30, may be applied between the overlapping flanges 26 and 28 to effectively secure the tubing structures together.

Figure 6:
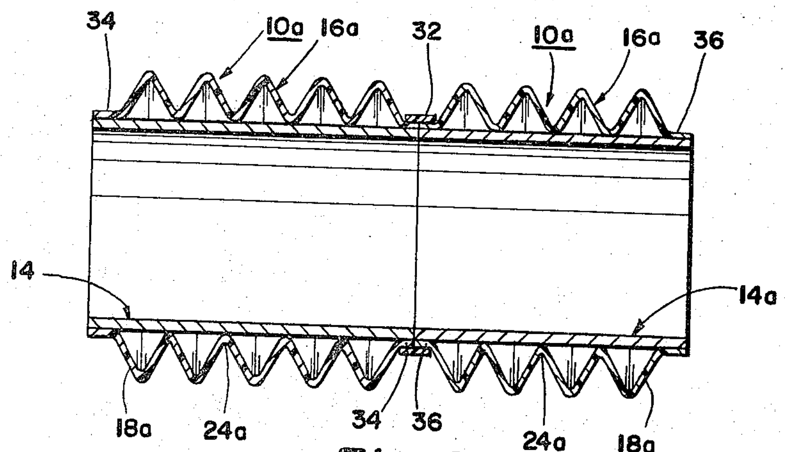
FIG. 6 is a fragmentary section view illustrating in another form two of the composite tubing structures of the present invention coupled together by means of a flexible joint or collar.
Figure 7:
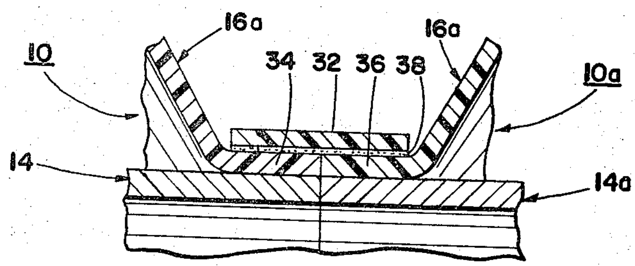
FIG. 7 is an enlarged, fragmentary section view illustrating the coupling arrangement for attaching two or more of the composite tubing structures together, as shown in FIG. 6.

In FIGS. 6 and 7, the tubing system illustrated is generally of a similar type as that shown in FIGS. 4 and 5, except that in the form shown, the composite tubing structure, designated generally at **10*a* comprises an inner tube or casing 14*a* which is preferably made from a thin, generally rigid material, such as sheet metal or cold rolled steel, that has been bent or otherwise transformed into the desired cylindrical shape. The tube 14*a* similarly serves as a support for a surrounding outer corrugated tubing 16*a* which in the embodiment shown, is made from a moldable or extrudable polymeric material, as aforementioned. The inner tube 14*a* is similarly tightly, yet slidably inserted axially within the outer tubing 16*a* so that the trough-like radii 24*a* are disposed in surface-to-surface contact or contiguous relationship with portions of the outer peripheral surface of the inner tube 14*a***.

In the embodiment illustrated in FIGS. 6 and 7, rather than being coupled together by means of a bell and spigot arrangement any number of composite tubing structures, as indicated, may be coupled together by means of a flexible collar designated generally at 32. As best shown in FIG. 7, the opposed ends of the outer corrugated tubing **16*a* of each of the respective abutting tubing structures are preferably formed to extend downwardly and outwardly providing endless, annular flanges 34 and 36 which are generally coextensive in length with the inner tubing 14*a*. Respective flanges 34 and 36 are preferably of a diameter to be tightly, yet slidably disposed about the inner tube 14*a* so as to form a more or less planar supporting surface between abutting tubular structures for the resilient collar 32**.

The resilient collar 32 is preferably made from a moldable or extrudable polymeric material, such as polyvinyl chloride, styrene or the like and is preferably of a size to be disposed around the annular supporting surface presented by the respective flanges 34 and 36. Moreover, the resilient collar 32, being of a generally cylindrical construction, can readily be secured around one end of a composite tubing structure, so that another composite tubing structure can then be slidably disposed in abutting end-to-end relationship against the first mentioned composite tubing structure and in tightly secured underlying relation relative to the resilient collar 32. Here again, it may be desirable in some instances to apply a suitable adhesive, such as shown at 38, to provide an effective seal between respective of the composite tubing structures and a flexible collar for the purposes as aforementioned.

Figure 8:
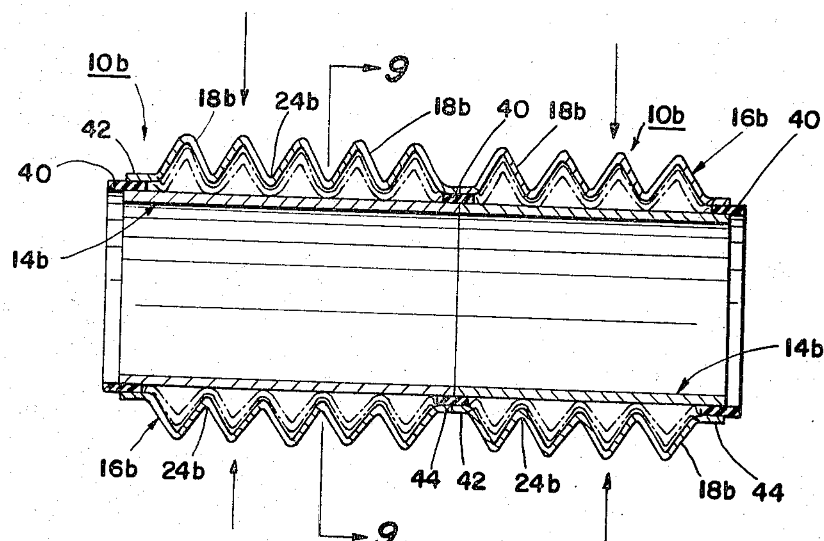
FIG. 8 is a longitudinal section view illustrating a modified construction of the composite tubing structure made in accordance with the present invention, and further illustrating two of such modified composite tubing structures coupled together in end-to-end relationship.
Figure 9:
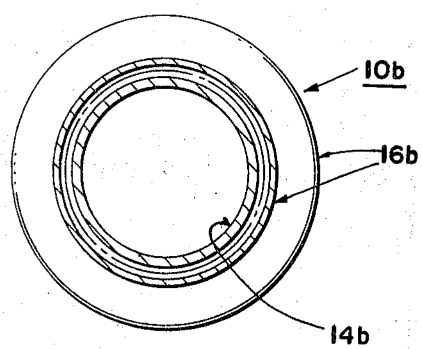
FIG. 9 is a vertical cross section view taken substantially along the plane of line 9—9 of FIG. 8.
Figure 10:
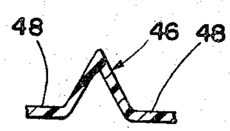
FIGS. 10 to 14, inclusive, are fragmentary section views illustrating various modified forms and constructions of the outer corrugated tube made in accordance with the present invention.

In FIGS. 8 and 9 there is illustrated another composite tubing system which is generally similar to that illustrated in FIGS. 4 to 7, inclusive, except that in the form shown, the composite tubing structure, designated generally at **10*b*, comprises an inner tube or casing 14*b* which is preferably made from thin generally rigid material, such as sheet metal or cold rolled steel that has been bent into the desired cylindrical shape, as aforesaid. In the form shown, however, the inner tube 14*b* serves as a support for a surrounding corrugated tubing 16*b*** which is preferably made from a thin, generally flexible material, such as spring steel, sheet metal or cold rolled metal having spring-like characteristics.

In the embodiment shown, the outer tubing **16*b* has a relatively greater transverse dimension than the transverse dimension of the inner tube 14*b* so that the trough-like radii 24*b* defined by respective of the adjacent corrugations 18*b* are spaced radially a predetermined distance from the outer peripheral surface of the inner tube 14*b*. Moreover, by such an arrangement the inner tube 14*b* imparts more or less rigid strength characteristics to the composite tubing structure while the spaced relationship of the outer corrugated tubing 16*b*** imparts optimum flexibility and crush resistance characteristics to the composite tubing structure, thereby to effectively withstand radial load pressures exerted on the structure in normal application thereof.

To provide a continuous system for the conveyance and/or transmission of energy from one area to another, any number of the composite tubing structures **10*b* may be provided at the opposed ends thereof with a coupling means in the form of a cylindrical collar or sleeve 40 for joining the structures together in end-to-end relation. In the embodiment shown, each sleeve 40 may be made from metal and welded or pressed-fitted onto a corresponding end of the inner tube 14*b*; or the sleeve may be made from a moldable or extrudable polymeric material, or from a rubber or synthetic rubber material and elastically disposed around the end of the inner tube and/or secured thereto by means of a suitable adhesive, as known in the art. The outer corrugated outwardly projecting annular flanges 42 and 44 which are coextensive in length with the opposed ends of the inner tube 14*b*. Moreover, this forms the transverse dimension of flanges 42 and 44 is relatively greater than the transverse dimension of the coupling sleeve 40** so that the flanges can be tightly, yet slidably disposed in overlying relation with respect to the sleeve and in abutting engagement with one another for jointing two or any number of the composite structures together.

Accordingly, an application of this form of the composite tubing system, it can readily be seen from FIGS. 8 and 9, that the flexible corrugated construction and peripherally spaced disposition of the outer tubing **16*b* relative to the inner tube 14*b* enables the outer tubing to be flexed inwardly, as shown by broken lines, upon application of radial load pressure being applied thereto, as shown by the arrows, until the trough-like radii 24*b* defined by the respective corrugations 18*b*** are brought into abutment against corresponding portions of the outer peripheral surface of the inner tube. Hence, by such an arrangement any number of composite tubing structures can be coupled together in end-to-end relation and buried in supporting media, such as the earth, concrete or the like, for the conveyance and/or transmission of energy and in a manner so that the respective inner tubes will be retained in axial alignment with one another irrespective of shifting movement and/or changing contour in the supporting media due to the resilient compensating effect of the surrounding outer corrugated tubings.

Figure 11:
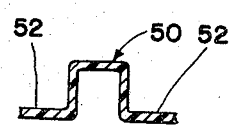
Figure 12:
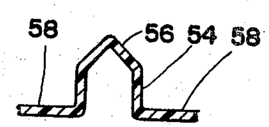
Figure 13:
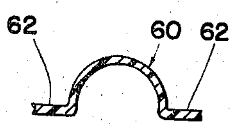
Figure 14:
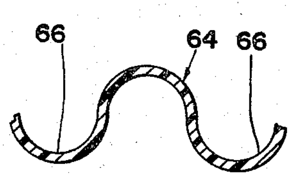

In FIGS. 10 to 14, inclusive, there is illustrated other various modified cross-sectional shapes which may be advantageously utilized for the corrugations of the outer tubing made in accordance with the present invention. More specifically, in FIG. 10 each corrugation 46 is shown as being of a generally triangular shape in cross-section having generally planar trough portions 48 for interconnecting adjacent of the corrugations together. In FIG. 11, each corrugation 50 is illustrated as being generally square in cross-section having similar generally planar interconnecting trough portions 52. The corrugated shaped in FIG. 12 includes a generally square shaped, in cross-section, base portion 54 with a generally triangular shaped apex portion 56. In this form the corrugation also includes generally planar interconnecting trough portions 58. In FIG. 13, the corrugation 60 is of a generally curved, semi-circular shaped, in cross-section, with generally planar interconnecting trough portions 62; and in FIG. 14 the corrugation 64 and interconnecting trough portions 66 together define a generally curved, sinusoidal shape in cross-section. Accordingly, while various cross-sectional shapes have been illustrated for the corrugations, it is to be understood that other shapes and/or configurations such as polygonal, as well as non-polygonal shapes may also be advantageously utilized in accordance with the principle of the present invention.

From the foregoing description and accompanying drawings, it will be seen that the present invention provides an improved composite tubular, yet corrugated structure for use in the conveyance and/or transmission of energy, such as in the transmission of electrical energy from one area to another. It will be seen that such composite tubular, yet corrugate structure possesses high strength, and particularly good crush-resistant characteristics compared to heretofore known types of arrangements, and which can be readily and economically produced at a substantially reduced cost compared to heretofore known types of arrangements. In addition, the present invention provides a composite tubular structure which can be readily and easily coupled to any number of other similar types of composite tubular structures to provide a continuous system for the conveyance and/or transmission of energy from one area to another irrespective of shifting movements and/or changing contour in the supporting media.

The terms and expressions which have been used herein are terms of description and not of limitation, and there is no intention in the use of such terms and expressions of excluding any equivalents of the features shown and described, or portions therof, but it is recognized that various modifications are possible within the scope of the invention claimed.

I claim:

1. A composite tubing structure for use in the art of conveyance and/or transmission comprising, an inner cylindrical tubing member, an outer polymeric tubing member supported by and encompassing said inner tubing member, said outer tubing member including a plurality of radially symmetric corrugations extending axially thereof, said inner tubing member including attachment means at opposed ends thereon, the attachment means at one end including a flange extending outwardly from and forming an extension of said outer member but spaced radially from said inner tubing member to provide a bell-like construction, and the attachment means at the other end including another flange extending outwardly from and forming an extension of said outer tubing member, said second mentioned flange being coextensive with and continuous through said inner tubing member to provide a spigot-like construction for fitment beneath and in engaged relationship with a corresponding bell-like construction on another composite tubing structure.

2. A composite tubing structure in accordance with claim 1 wherein portions of said corrugations are disposed in contiguous engaged relationship with the outer periphery of said inner tubing member.

3. A composite tubing structure in accordance with claim 1 wherein substantially all of said corrugations are spaced a predetermined distance radially from the outer peripheral surface of said inner tubing member.

4. A composite tubing structure for use in the art of conveyance and/or transmission comprising, an inner cylindrical tubing member, and outer polymeric tubing member supported by and encompassing said inner tubing member, said outer tubing member including a plurality of radially symmetric corrugations extending axially thereof, said inner tubing member including attachment means at opposed ends thereof, the attachment means at one end including a flange extending outwardly from and forming an extension of said outer member, and another flange at the other end extending outwardly from and forming an extension of said outer tubing member, and each of said flanges being coextensive with and contiguous to the outer peripheral surface of said inner tubing member adapted to engageably receive thereon an endless locking member, said locking member comprised of a polymeric material and adapted to be disposed in circumferentially encompassing relationship with respect to said flanges.

5. A system for use in the art of conveyance and/or transmission, comprising a plurality of elongated composite tubing structures joined together in end-to-end relationship, each of said composite structures being of a predetermined length and including an inner cylindrical tubing member and an outer polymeric corrugated tubing member encompassing said inner tubing member to provide crush-resistant characteristics in the composite tubing structure, each of said composite tubing structures including attachment means at the opposed ends for joining the structures in said end-to-end relation, the attachment means at one end including a flange extending outwardly from and forming an extension of said outer tubing member but spaced radially from said inner tubing member to provide a bell-like construction, and the attachment means at the other end including another flange extending outwardly from and forming an extension of said outer tubing member, said second mentioned flange being coextensive with and contiguous to said inner tubing member to provide a spigot-like construction disposed to be fitted beneath the bell-like construction of and adjacent to one of said composite tubing structures.

6. A system in accordance with claim 5, wherein the innermost portions of said corrugations are disposed in contiguous engaged relationship with the outer peripheral surface of said inner tubing member.

7. A system in accordance with claim 5, wherein substantially of said corrugations are spaced radially from the outer peripheral surface of said inner tubing member.

8. A system for use in the art of conveyance and/or transmission comprising, a plurality of elongated composite tubing structures joined together in end-to-end relationship, each of said composite structures being of a selected length and including an inner cylindrical tubing member and an outer polymeric corrugated tubing member encompassing said inner tubing member, each of said composite tubing structures including attachment means at the opposed ends thereof for joining the same in said end-to-end relationship, the attachment means at each end including a flange extending outwardly from and forming an extension of said outer tubing member, and said flanges each being coextensive with and disposed in contiguous relation to the outer peripheral surface of said inner tubing member, and an endless locking member disposed in circumferential engaged relationship around said flanges for holding adjacent of said composite tubing structures in said end-to-end relationship.

References Cited

UNITED STATES PATENTS

| | | | |
|---|---|---|---|
| 2,337,038 | 12/1943 | Fentress | 285—300 X |
| 2,898,941 | 8/1959 | Kilcup | 138—121 |
| 2,934,095 | 4/1960 | Lockhart | 138—121 |

FOREIGN PATENTS

| | | |
|---|---|---|
| 1,142,257 | 1/1963 | Germany. |

LAVERNE D. GEIGER, *Primary Examiner.*

H. S. BELL, *Assistant Examiner.*